L. P. COULTER.
WELDING CONTROLLER.
APPLICATION FILED MAY 6, 1915.
1,278,860.
Patented Sept. 17, 1918.
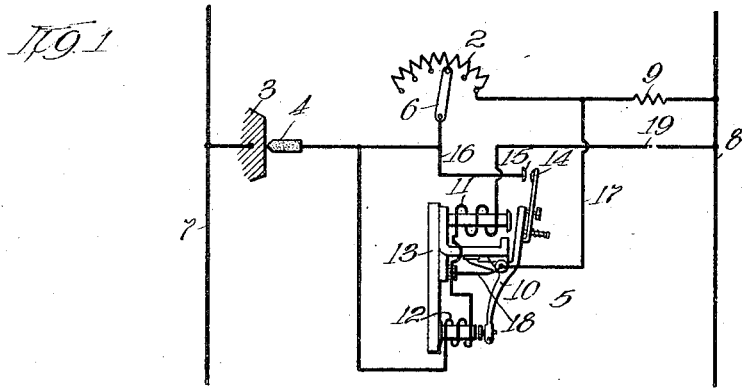
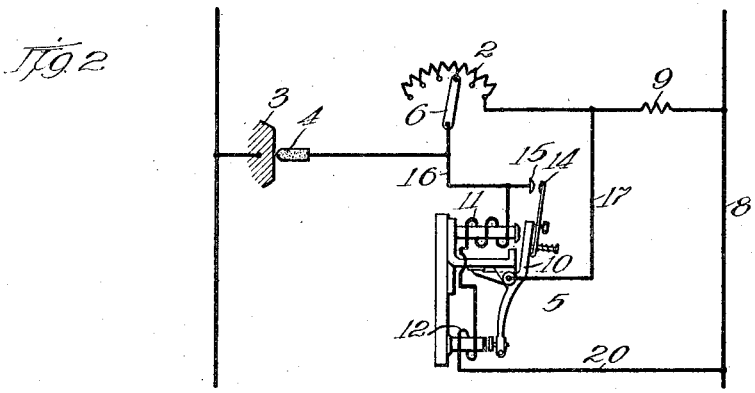
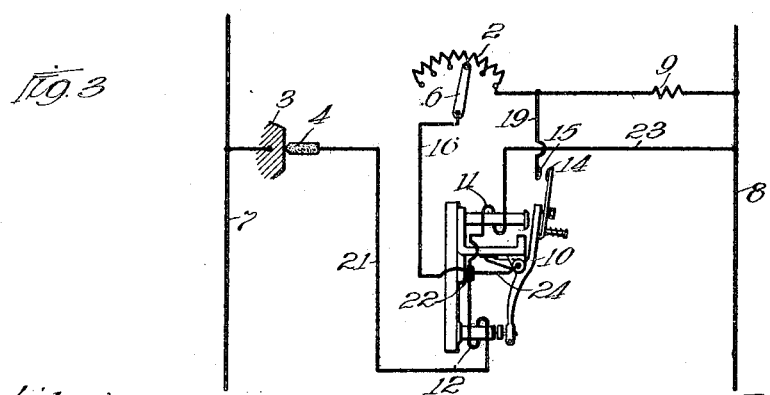
Witnesses:
Inventor:
Leonard P. Coulter
By Edwin B. H. Tower Jr. Atty.

UNITED STATES PATENT OFFICE.

LEONARD P. COULTER, OF MILWAUKEE, WISCONSIN, ASSIGNOR TO THE CUTLER-HAMMER MFG. CO., OF MILWAUKEE, WISCONSIN, A CORPORATION OF WISCONSIN.

WELDING-CONTROLLER.

1,278,860.

Specification of Letters Patent.

Patented Sept. 17, 1918.

Application filed May 6, 1915. Serial No. 26,271.

*To all whom it may concern:*

Be it known that I, LEONARD P. COULTER, a citizen of the United States, residing at Milwaukee, in the county of Milwaukee and State of Wisconsin, have invented new and useful Improvements in Welding-Controllers, of which the following is a specification.

This invention relates to welding controllers.

The electric arc used in arc welding is generally obtained by completing an electric circuit by means of welding electrodes and subsequently separating the electrodes to draw an arc. Various controllers have been devised for limiting the flow of current until the arc has been struck and its resistance increased. A current limiting means is generally associated with the circuit and means is provided for excluding the current limiting means to increase the voltage across the arc to produce an arc of sufficient length and volume for welding purposes.

A welding controller is described in a co-pending application of Tower & Van Nest, Serial No. 13,608, filed March 11, 1915 which has an electromagnetic switch in the welding circuit arranged to control the current limiting means. This switch is adapted to remain open when the current through its operating means is high and to close when the current decreases to a predetermined value. The operating means of the switch remains in whole or in part in the welding circuit during the welding operation.

The present invention relates more particularly to improvements in the type of controller described in said application.

One object of this invention is to provide an improved welding controller which will automatically regulate the welding current and in which the windings of the automatic switch are responsive indirectly to the welding current.

Another object of this invention is to provide an improved welding controller having an automatic switch which will not be subjected to the full welding current and in which the current supplied to the switch will be still further reduced after the switch has operated.

Other objects and advantages of the invention will hereinafter appear.

The accompanying drawings illustrate several embodiments of the invention.

The views of said drawing are as follows:

Figure 1 is a diagrammatic view of a welding controller.

Figs. 2 and 3 are diagrammatic views of modified forms of controllers.

The controller comprises in general a current limiting means 2 for regulating the current through the welding electrodes 3 and 4, and an automatic switch 5 responsive indirectly to the current in the welding circuit for controlling the current limiting means.

The current limiting means comprises a resistance 2 of any suitable type having a movable arm 6 associated therewith for regulating the amount thereof. The resistance is connected in series with electrodes 3 and 4 across the supply mains 7 and 8. This resistance limits the current in the welding circuit to a safe value when the circuit is completed and it may be called, for convenience, the starting resistance. It is excluded from the circuit by the automatic switch 5 as will hereinafter be described.

A second resistance 9, called the limiting resistance, is connected in series with resistance 2 across the supply mains 7 and 8. This resistance is always in the circuit of electrodes 3 and 4 so as to prevent an absolute short-circuit between the supply mains. The value of this resistance is such that sufficient current flows for welding purposes.

The automatic switch 5 is adapted to hold open when the current in its operating means is high and to close when the current decreases to a predetermined value. A switch of this type is fully described in a co-pending application of Barnum & Date, Serial No. 800,700, filed November 13, 1913.

The switch 5 has a movable member 10, electromagnetically controlled by windings 11 and 12 mounted on an insulating base 13. The member 10 carries a contact 14 adapted to engage a stationary contact 15. The windings 11 and 12 of the switch are connected in series and are accordingly subject to the same electrical conditions. They have different pull characteristics which are so related that when the energizing current is high the switch is held open by winding 12 and when the current decreases to a predetermined value it is closed by winding 11. The point at which the switch will close may be adjusted by adjusting the armature 10 of winding 12 so as to vary the reluctance of the magnetic circuit. Other means of varying the relative effectiveness of windings 11 and 12 may be employed. It should also be understood that other switches which will open when current through their operating means is high and will close when the current decreases to a predetermined value may be used.

The windings of switch 5 are of relatively high resistance. They are connected in shunt to the resistances 2 and 9 and are accordingly responsive to the voltage drop across said resistances, or, in other words, responsive indirectly to the current in the welding circuit. When the contacts 14 and 15 of the switch are closed a shunt circuit is completed around resistance 2 which may be traced from the positive line 7 through electrodes 3 and 4, conductor 16, contacts 15 and 14, switch member 10, conductor 17, resistance 9 to negative line 8. It will thus be seen that when the switch is closed the resistance 2 is removed from the welding circuit. The switch is normally biased to open position by gravity, so that when the circuit through the switch windings is broken the member 10 automatically moves to open position and separates contacts 14 and 15.

The controller is shown in normal position in Fig. 1. The switch 5 is open and the starting and limiting resistances 2 and 9 are in series with the electrodes 3 and 4. The operation of the controller is as follows:

The welding circuit is completed at the electrodes 3 and 4 and current flows from the positive line 7 through electrodes 3 and 4, the resistances 2 and 9 to the negative line 8. An excessive rush of current is prevented by reason of the resistances in the circuit. The current through the windings 11 and 12 of the switch 5 is determined by the voltage drop across resistances 2 and 9. The switch is adjusted to hold open for the relatively high current which flows when the welding circuit is completed. As the electrodes are drawn apart to strike an arc the resistance between them increases and the current accordingly decreases. When the current has decreased to a predetermined value the switch 5 closes thereby removing the resistance 2 from the welding circuit and allowing the current to flow from positive line 7 through the electrodes, conductor 16, contacts 14 and 15, switch member 10, conductor 17 and limiting resistance 9 to the negative line 8. The elimination of the resistance 2 allows a heavy welding current to flow whose value is determined mainly by the resistance of the arc.

The closing winding 11 of switch 5 is in shunt to the limiting resistance 9 when the switch is closed. The circuit may be traced as follows: from positive line 7 through electrodes 3 and 4, conductors, 16, contacts 14 and 15, switch member 10, conductor 18, winding 11 and conductor 19 to negative line 8. The voltage drop across the resistance 9 causes a sufficient current to flow through the winding 11 to keep the switch closed.

The limiting resistance 9 prevents an absolute short-circuit in case the welding circuit is completed with the arm 6 of resistance 2 adjusted so that none of the resistance 2 is in circuit. It also prevents a short-circuit in case the electrodes are accidentally brought together after an arc has been established and the switch 5 has operated to cut the resistance 2 out of circuit. The limiting resistance 9 therefore acts as a safeguard to prevent absolute short-circuit between the supply mains.

When the weld is completed and the electrodes are separated the welding circuit is broken and the coils 11 and 12 are deenergized. The switch 5 automatically opens and inserts the resistance 2 in the welding circuit so that the controller is again in condition for operation.

It will thus be seen that a welding controller has been provided in which the automatic switch is responsive to the welding current without being subjected directly thereto. The windings need not therefore be designed to carry heavy currents for long periods of time. The controller automatically reinserts the starting resistance when the welding circuit is broken so that the apparatus is again in condition for operation. The welding current is accordingly automatically controlled; the switch is not subjected to excessive currents; and the welding circuit is always in condition for safe operation.

Fig. 2 illustrates a controller similar to that of Fig. 1 but having different circuit connections for the switch 5. The windings 11 and 12 are both connected in shunt to resistance 9 when the switch is closed instead of only the winding 11 as in Fig. 1.

When the switch is open, the windings 11 and 12 are in shunt to resistances 2 and 9, their circuit being as follows: from positive line 7 through electrodes 3 and 4, conductor 16, windings 11 and 12, conductor 20 to negative line 8.

When the switch is closed current flows from positive line 7 through electrodes 3 and 4, conductor 16, contacts 15 and 14, switch member 10, conductor 17 and limiting resistance 9 to negative line 8. Both of the windings 11 and 12 are connected in shunt to the limiting resistance when the switch is closed, the circuit being from conductor 16 through windings 11 and 12 and conductor 20 to negative line 8. The voltage drop across resistance 9 accordingly causes a current to flow through both of the windings. This current keeps the switch closed.

Fig. 3 illustrates a further modification of the controller. In this modification the starting resistance 2 is connected to a binding post 22 between the windings 11 and 12 of the switch 5.

When the welding circuit is completed by the electrodes, current flows from positive line 7 through electrodes 3 and 4, conductor 21, winding 12, conductor 16, starting resistance 2 and limiting resistance 9 to negative line 8. A certain proportion of the current also flows through the closing winding 11 of switch 5, the circuit being from the binding post 22, through winding 11 and conductor 23 to line 8. The resistance of winding 11 is relatively high so that the main portion of the current flows through the starting resistance.

It will thus be seen that the closing winding 11 of the switch is in shunt to the starting and limiting resistances and the holding winding 12 is in series with the electrodes. The pull characteristics of these windings are so adjusted that when the current decreases upon separation of the electrodes, the winding 11 predominates and closes the switch. The closure of the switch shunts the starting resistance 2. The circuit is as follows:—from positive line 7 through electrodes 3 and 4, conductor 21, winding 12, binding post 22, conductor 24, switch member 10, contacts 14 and 15, conductor 19 and limiting resistance 9 to line 8. The closing winding 11 is then in shunt to the limiting resistance 9 and the current therethrough is determined by the drop across said resistance. The winding 11 serves to keep the switch closed against the action of winding 12 which is in series in the circuit, since, when the switch armature has sealed with the core of winding 11, the gap between the core of winding 12 and its armature is so large that the pull of winding 12 cannot overcome the pull of winding 11 to open the switch.

It should be understood that the embodiments of the invention shown are for purposes of illustration only and that other structures may be devised which will embody the same and which are included in the spirit and scope of the appended claims.

What I claim as new and desire to secure by Letters Patent of the United States is:

1. A welding controller having a starting and a limiting resistance in the welding circuit, a switch having electromagnetic operating means in shunt to said resistances to hold the switch open under certain electrical conditions and to close it under other electrical conditions to exclude the starting resistance and the portion of the electromagnetic operating means tending to hold the switch open.

2. A welding controller having a starting and a limiting resistance in the welding circuit, a shunt around said resistances, a lockout switch having a holding and a closing winding in said shunt for automatically cutting out the starting resistance as the current in the shunt decreases and connecting the closing winding of the switch in shunt to the limiting resistance.

3. A welding controller having a starting and a limiting resistance in the welding circuit, a shunt around said resistances, a lockout switch having a holding and a closing winding in said shunt for automatically cutting out the starting resistance as the current in the shunt decreases and connecting the closing winding of the switch in shunt to the limiting resistance, said switch being normally biased to open position whereby the starting resistance is automatically reinserted when the welding circuit is broken.

4. A welding controller having a resistance in the welding circuit, a switch having electromagnetic operating means in shunt to said resistance to hold the switch open under certain electrical conditions and to close it under other electrical conditions to shunt the resistance and a portion of the electromagnetic operating means.

5. A welding controller having a starting and a limiting resistance in the welding circuit, an electromagnetic switch having a closing winding and a holding winding connected in series in a shunt to said resistances to hold the switch open when the starting current is high and to close it when the current decreases to a predetermined value to exclude the starting resistance from the welding circuit and connect the closing winding in shunt to the limiting resistance.

6. A welding controller having a starting and a limiting resistance in the welding circuit, a lockout switch having electromagnetic operating means in shunt to said resistances, said switch being adapted to cut out the starting resistance when the current decreases to a predetermined value and connect a portion of the switch operating means in shunt to the limiting resistance whereby the switch is held closed, said switch being biased to open position whereby the starting resistance is automatically reinserted when the welding circuit is broken.

7. A welding controller having a resistance in the circuit of the electrodes, a lockout switch having a closing winding and a holding winding in shunt to said resistance adapted to hold the switch open when the welding circuit is completed and the current through the resistance is high, and to close the switch to exclude the resistance when the electrodes are separated to draw an arc.

8. A welding controller having a starting and limiting resistance in the circuit of the electrodes, a lockout switch having a closing winding and a holding winding in shunt to said resistances whereby when the welding circuit is completed by the electrodes and the current through the resistance is high the switch is held open and when the electrodes are separated and the current decreases the switch is closed to exclude the starting resistance, said switch being normally biased to open position whereby when the welding circuit is broken the starting resistance is automatically reinserted.

9. A welding controller having a starting and a limiting resistance in the circuit of the electrodes, a lockout switch having a closing winding and a holding winding in shunt to said resistances whereby when the welding circuit is completed by the electrodes the switch is held open and when the electrodes are separated to draw an arc the switch is closed to exclude the starting resistance and connect the closing coil in shunt to the limiting resistance whereby the switch is held closed.

10. A welding controller having a starting and a limiting resistance in the circuit of the electrodes, a lockout switch having a closing winding and a holding winding serially connected in shunt to said resistances, said windings having different pull characteristics whereby when the welding circuit is completed by the electrodes and the current through the resistance is high the holding winding keeps the switch open and when the electrodes are separated and the current through the resistance decreases the switch is closed by the closing winding to exclude the starting resistance and connect the closing winding in shunt to the limiting resistance.

11. A welding controller having a resistance in the circuit of the electrodes, a switch having a closing winding and a holding winding serially connected in shunt to the resistance, said windings having different pull characteristics whereby the switch is held open under certain electrical conditions and is closed under other electrical conditions to exclude the resistance from the circuit of the electrodes.

12. A welding controller having two sections of resistance in the circuit of the electrodes, and a switch having electromagnetic means in shunt to both sections of the resistance to hold the switch open under certain electrical conditions and to close it under other electrical conditions to exclude one section of the resistance and to connect said electromagnetic means in shunt to the remaining section of resistance.

In witness whereof, I have hereunto subscribed my name in the presence of two witnesses.

LEONARD P. COULTER.

Witnesses:
R. B. HUNTER,
L. C. SCHANTZ.